(12) United States Patent
Lawrence

(10) Patent No.: US 6,531,683 B1
(45) Date of Patent: Mar. 11, 2003

(54) BOOM CONTROL SYSTEM

(76) Inventor: Kris E. Lawrence, 201 N. Scandia, Alpha, IL (US) 61413

( * ) Notice: Subject to any disclaimer, the term of this patent is extended or adjusted under 35 U.S.C. 154(b) by 0 days.

(21) Appl. No.: 09/998,282

(22) Filed: Nov. 30, 2001

(51) Int. Cl.$^7$ ............................. B23K 9/12; B23K 5/00
(52) U.S. Cl. ......................... 219/125.1; 219/125.11; 219/125.12; 228/25; 228/47.1
(58) Field of Search ................. 228/25–43, 47.1; 219/125.1, 125.11, 125.12; 212/292, 294, 199, 236; 414/22.55, 680, 564

(56) References Cited

U.S. PATENT DOCUMENTS

| | | | | |
|---|---|---|---|---|
| 3,913,820 A | * | 10/1975 | Valentine | 228/25 |
| 4,050,587 A | * | 9/1977 | Moen | 212/301 |
| 4,384,817 A | * | 5/1983 | Peterson | 280/402 |
| 4,407,625 A | * | 10/1983 | Shum | 212/236 |
| 4,577,819 A | * | 3/1986 | Bennett | 248/123.11 |
| 4,660,753 A | * | 4/1987 | Kushibe et al. | 219/125.11 |
| 4,807,486 A | * | 2/1989 | Akeel et al. | 74/490.06 |
| 4,896,015 A | * | 1/1990 | Taboada et al. | 219/121.78 |
| 5,445,487 A | * | 8/1995 | Koscinski, Jr. | 269/130 |
| 5,826,859 A | * | 10/1998 | Kononov et al. | 254/134.3 R |
| 6,297,472 B1 | * | 10/2001 | Bong et al. | 219/125.12 |
| 6,305,678 B1 | * | 10/2001 | Hammersmith et al. | 269/71 |
| 6,330,966 B1 | * | 12/2001 | Eissfeller | 219/125.1 |

\* cited by examiner

Primary Examiner—Tom Dunn
Assistant Examiner—L. Edmondson
(74) Attorney, Agent, or Firm—Harsha & Associates

(57) ABSTRACT

A boom control system having rotational and elevation control of the boom. The boom is utilized in a welding apparatus utilizing a conduit to deliver the welding material to the work piece. The elevation of the boom may be adjusted by discrete steps, with a positive method of retaining the boom at a desired elevation. The desired elevation is determined by the operator as that elevation which will keep the conduit or carrier from contacting the hard surface of the floor and the work piece. The rotation may be accomplished by any well known method such as a turntable on which the elevation mechanism is mounted.

9 Claims, 2 Drawing Sheets

BOOM CONTROL SYSTEM

BACKGROUND OF THE INVENTION

This invention relates to wire welding devices and particularly to improvement of the booms and feeding of wire to workstations.

The prior art reduced wire feeding problems caused by sharp bends in torch conduits or cables. The prior art also included a counter balancing device associated with the boom to maintain a fixed elevation angle of the boom except when faced out of balance by the operator in order to weld at the workstation. The boom swiveled on a swivel post.

The bends were substantially eliminated by this device, but the wear and tear on the cable during transfer from one workstation to another is continued. The wear was the result of the cable dragging on the floor or on the surface of the large work pieces, thus the cables wore out quite rapidly, requiring purchase of new units.

SUMMARY OF THE INVENTION

This invention provides for controlled elevation angles of the boom so that the operator can adjust the boom with more precision and without overcoming the retractive force of the counter balance spring or weight of the prior art.

This invention provides the ability to retrofit or originally fit a plate on the boom to a rotating plate or turntable mechanism, well known in the art, to permit rotation of the boom as required. All existing swivels are on a swivel post which does not provide the base area for support of the boom and wire feeder.

The invention then provides choices of various fixed elevations of the boom. The operator can quickly and exactly choose the right boom elevation for a particular job to ensure that the cable or conduits are not dragging on the floor or across the work piece, especially large pieces such as reels or drums. By nearly always having the hose or cable free of contact with a hard surface, life of a conduit is increased by a significant factor i.e., up to four times the life. Thus replacement cost are also reduced by the same factor. This increased life is possible because the boom elevation is fixed for a particular job as contrasted with the considerable amount of movement or change in elevation occurring with no control or a counter balanced boom. With no accurate fixed mechanical adjustment of the boom elevation angle, the conduits are in almost constant contact with the floor or large work pieces. The hose or conduit in the prior art is in contact with the top of a large work piece when welding on the side away from the wire source.

This improvement is accomplished by the utilization of a fixed elevation angle controller which has a plurality of fixed elevation positions to permit the hose or conduit to be at any required elevation to keep them off the floor and the work piece.

This invention provides a novel means of fixed yet varied control of the elevation of the conduit of a welding device while being free to horizontally rotate in the selected fixed elevation. Rotation is provided by a base sufficiently large to support the boom and any devices mounted on the boom, the base is fixed to and rotatable on a rotary turntable.

BREIF DESCRIPTION OF THE DRAWINGS

DESCRIPTION OF THE PREFERRED EMBODIMENT

Figure 1:
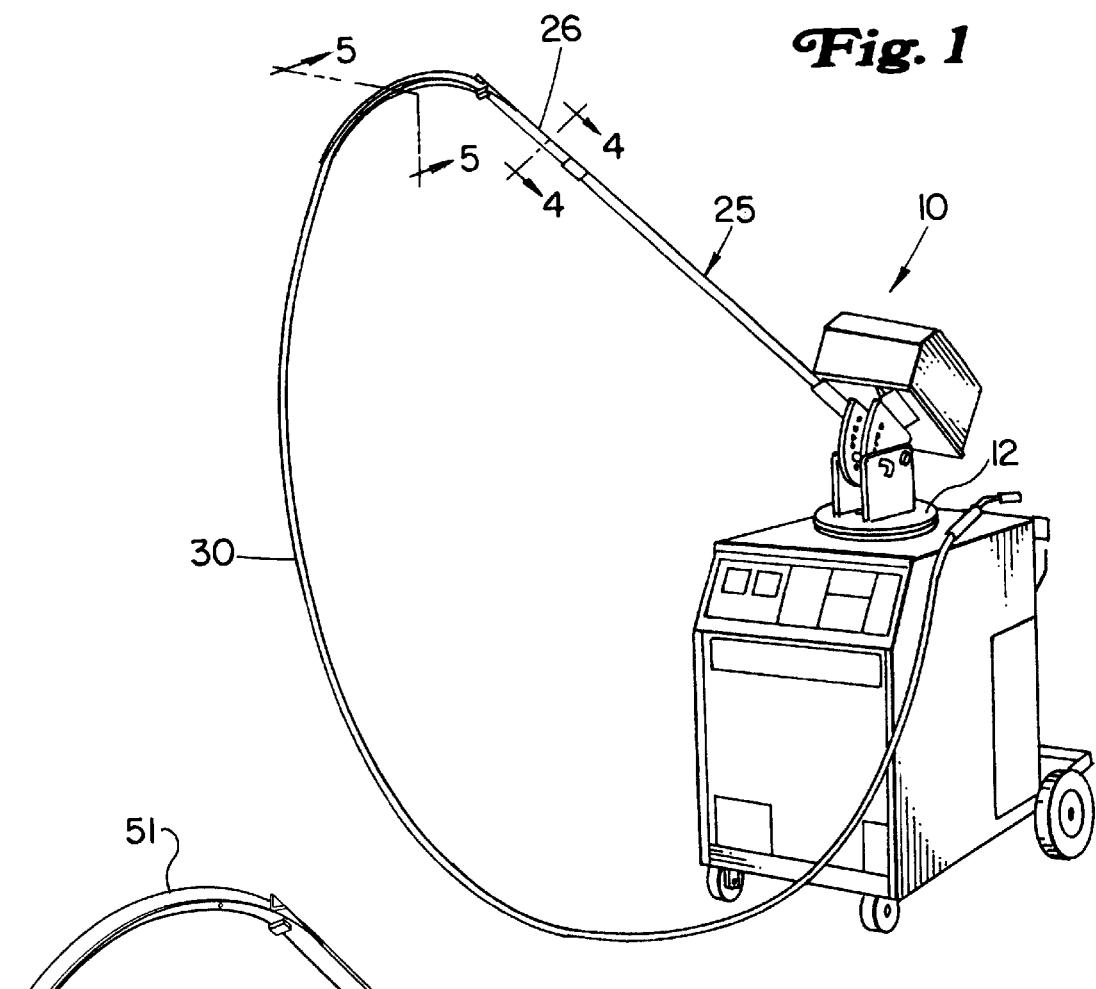
FIG. 1 is a diagrammatic view of the novel boom of this invention mounted on a welding device.
Figure 2:
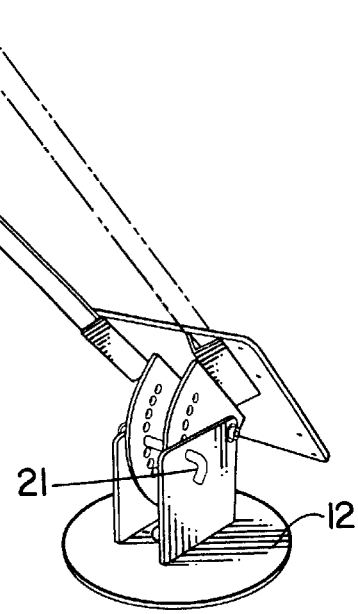
FIG. 2 is a diagrammatic view of the novel boom of this invention.

Referring first to FIG. 1, there is shown a boom elevation controller 10 mounted on a welding device. The novel boom controller 10 includes a rotary turntable 12, on which is mounted the novel boom elevation controller for controlling the vertical height of the outer end of the boom 25. The vertical height or elevation may need to be fixed at a plurality of values, the height being partly governed by the size and shape of the work piece.

Figure 3:
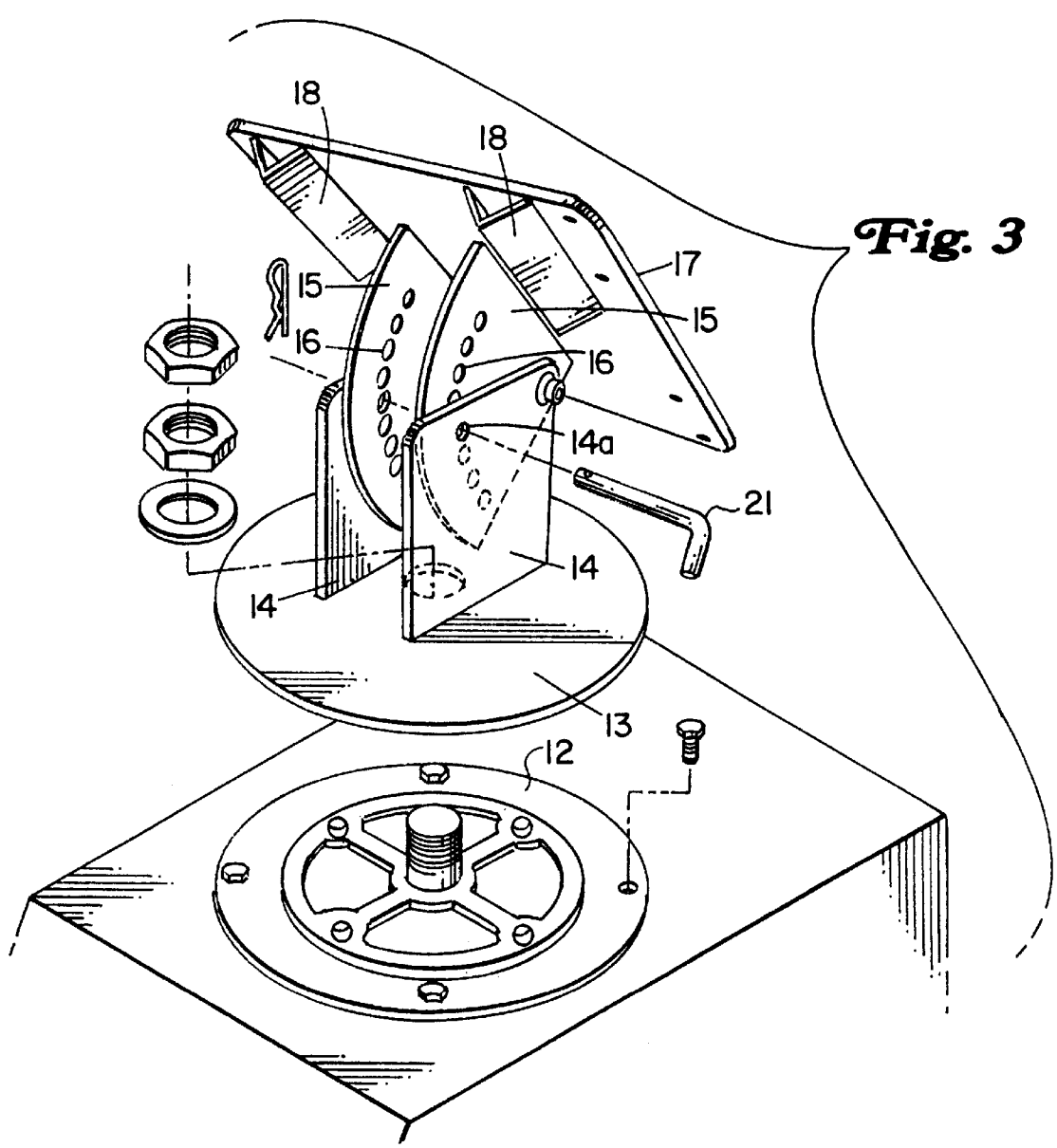
FIG. 3 is a detailed exploded view of this invention.

FIG. 3 shows a detail of one embodiment. The plate 13 is attached in known fashion to rotary turntable 12.

The elevation control includes support members 14 welded or affixed to the plate 13. These support members are vertical with respect to plate 13.

Each of these support members 14 has a single hole or orifice 14a aligned with each other. This hole location is determined by the location of the plurality of holes or voids 16 in the first plate members 15.

Holes 16 in the first plate members are formed or drilled on a circumference of the first plate members 15. The holes thus form on a circumference. The spacing between the holes 16 is determined by the number of stops or elevation positions desired. The selected holes 14a and 16 are held in alignment by insertion of pin 21 into all three aligned holes.

A second plate member 17 is affixed to the first plate member 15. This may be by weld or other means. Angled inserts 18 are welded to the second plate member 17 and may preferably be secured or welded to the ends of said first plate member 15 to secure the rigidity and as an alternative location for boom 25.

Boom 25 is attached to or held by second plate member and elevates therewith. Boom 25 may include insert 25a of well known design and varied lengths are shown in FIG. 4 and FIG. 5 for varying the length of the boom 19.

Figure 5:
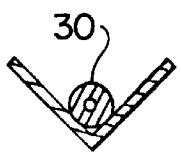
FIG. 5 is a cross sectional view of the boom of this device.
Figure 4:
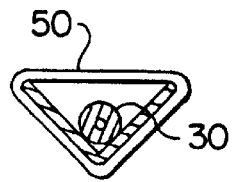
FIG. 4 is a cross sectional view of the boom of this device.

The welding cable or conduit 30 may be carried by the boom 25 as shown if FIG. 4 or FIG. 5 where it is contained by and protected by locking or retaining member 50 and the boom length may varied by 26 insertion of varied length sections of the boom.

In addition, a plurality of strips of relative stiff but still pliable material 21 may be added at the extremity of the boom to allow the conduit 22 to flex over a predetermined length to prevent crimping from a precipitous drag by gravity toward the deck.

What is claimed is:

1. A variable elevation and freely rotation boom for a welding device comprising:
   a) a rotary turntable;
   b) a plate for attachment to the rotary turntable;
   c) a plurality of support members attached to said plate;
   d) a hole in each of said support members, said holes in said members aligned with each other;
   e) a first plate member rotatably affixed (at one point) to each of said support members at the same point for rotation relative to said support member;
   f) said first plate members having a plurality of holes therein to circumferentially match the holes in said support members to secure the first plate members at a fixed angle with respect to the horizontal pin member inserted in said holes in said support members and one of said holes in each of said support members;

g) a second plate member affixed to said first plate member and rotatable therewith;

h) a boom attached to said second plate member and for supporting a conduit attached thereto.

2. The invention in accordance with claim 1, wherein each of said first plate members has a partial circumference.

3. The invention in accordance with claim 2, wherein said holes in said first plate members are located on a partial circumference of said first plate members.

4. The invention in accordance with claim 3, wherein said pin member is inserted in said holes in said support members and in a selected one of said holes in said first plate members to fix the elevation angle of said second plate member.

5. The invention in accordance with claim 1, wherein said boom is adjustable in length.

6. The invention in accordance with claim 1, wherein said boom has fixed pliable curved surface at its outer extremity.

7. The invention in accordance with claim 1, wherein a source of welding material is mounted on said second plate member to supply said material to said boom.

8. The invention in accordance with claim 1, wherein said first plate members are rotatable from a horizontal axis to a vertical axis.

9. The invention in accordance with claim 8, wherein said members are rotatable in steps predetermined by the spacing between the holes in said first plate members.

\* \* \* \* \*